United States Patent [19]
Eichholz et al.

[11] Patent Number: 5,174,495
[45] Date of Patent: Dec. 29, 1992

[54] ADJUSTING AND SERVICING A COMPUTER-CONTROLLED MIXING VALVE

[75] Inventors: Heinz-Dieter Eichholz, Iserlohn; Hans-Jürgen Ludewig, Rinteln, both of Fed. Rep. of Germany

[73] Assignee: Friedrich Grohe Armaturenfabrik GmbH & Co., Hemer, Fed. Rep. of Germany

[21] Appl. No.: 735,379

[22] Filed: Jul. 24, 1991

[30] Foreign Application Priority Data

Aug. 17, 1990 [DE] Fed. Rep. of Germany ....... 4026110

[51] Int. Cl.⁵ .......................................... G05D 23/13
[52] U.S. Cl. ................................. 236/12.12; 236/94
[58] Field of Search ............... 236/12.12, 46 R, 94; 364/502, 510; 165/12

[56] References Cited

U.S. PATENT DOCUMENTS

| | | | |
|---|---|---|---|
| 4,682,728 | 7/1987 | Oudenhoven | 236/12.12 |
| 4,711,392 | 12/1987 | Kidouchi et al. | 236/12.12 |
| 4,854,498 | 8/1989 | Stayton | 236/12.12 |
| 4,931,938 | 6/1990 | Hass | 364/510 X |
| 4,937,732 | 6/1990 | Brundisini | 364/510 X |

FOREIGN PATENT DOCUMENTS

| | | | |
|---|---|---|---|
| 0121200 | 10/1984 | European Pat. Off. | 165/12 |
| 0195271 | 9/1986 | European Pat. Off. . | |
| 0313913 | 5/1989 | European Pat. Off. . | |
| 0345785 | 12/1989 | European Pat. Off. . | |
| 0375259 | 6/1990 | European Pat. Off. . | |
| 91112933 | 10/1991 | European Pat. Off. . | |
| 3308252 | 9/1984 | Fed. Rep. of Germany | 165/12 |
| 3528050 | 2/1987 | Fed. Rep. of Germany . | |
| 3600383 | 7/1988 | Fed. Rep. of Germany . | |
| 3643519 | 2/1990 | Fed. Rep. of Germany . | |
| 2174510 | 11/1986 | United Kingdom . | |

*Primary Examiner*—William E. Wayner
*Attorney, Agent, or Firm*—Herbert Dubno

[57] ABSTRACT

An apparatus usable in combination with a mixing valve having hot- and cold-water inlets and a mixed-water outlet and a actuating drive for operating the valve to change the blend of hot and cold water at the outlet. The apparatus controls and sets the valve via the actuating drive and has a sensor at the outlet for producing an actual-value output corresponding to the temperature of the water at the output, a digital computer, a line connecting the computer to the sensor and to the actuating drive, a display for indicating settings of the computer, a removable program module engageable in the computer for supplying a valve- and user-specific program thereto, and an input panel connected to the computer for programming same.

17 Claims, 2 Drawing Sheets

ADJUSTING AND SERVICING A COMPUTER-CONTROLLED MIXING VALVE

FIELD OF THE INVENTION

The present invention relates to a mixing valve or device for mixing blended water. More particularly this invention concerns such a valve with an attached electronic regulation device that incorporates a microprocessor.

BACKGROUND OF THE INVENTION

German patent document 3,643,519 filed Dec. 19, 1986 by H. Kiendl et al describes a control device for a mixing valve. The valve is servo-controlled and the servomotor in turn is controlled by a microprocessor receiving an input from a temperature sensor in the output conduit. The microprocessor is programmed at the factory, with the program burnt in so that it cannot be subsequently changed.

German patent document 3,600,383 based on a British priority of Jan. 16, 1985 by K. Ellington et al describes such a system with special safety functions that close the valve under certain circumstances, for instance if the temperature at the outlet runs out of control despite adjustment attempts. Once again this system is preprogrammed and not adaptable to field conditions.

OBJECTS OF THE INVENTION

It is therefore an object of the present invention to provide an improved microprocessor-controlled mixing valve.

Another object is the provision of such an improved microprocessor-controlled mixing valve which overcomes the above-given disadvantages.

SUMMARY OF THE INVENTION

The instant invention is an apparatus usable in combination with a mixing valve having hot- and cold-water inlets and an mixed-water outlet and a actuating drive for operating the valve to change the blend of hot and cold water at the outlet. The apparatus controls and sets the valve via the actuating drive and has a sensor at the outlet for producing an actual-value output corresponding to the temperature of the water at the output, a digital computer, a line connecting the computer to the sensor and to the actuating drive, a display for indicating settings of the computer, a removable program module engageable in the computer for supplying a valve-specific program and a user-specific program thereto, and an input panel connected to the computer for programming same.

The advantages of the invention are that the same basic unit can be used on an entire line of mechanically controlled valves, with the specific needs of a specific valve taken care of by the specific program module. Thus if the mechanically controlled valve uses a bimetallic adjusting element or an expansible element, the appropriate program can be employed for it to improve control characteristics. With the control unit of this invention even unregulated adjusting elements can be set up to work as fully controlled ones, and can be set to have safety programs. The constructional separation of hardware and software components using two main different housing which are combined by data lines makes the unit very flexible.

According to this invention the computer is a single-chip microprocessor with an external program memory constituted as a plug-in erasable/programmable read-only memory (EPROM) and an internal data memory which is an electrically erasable programmable read-only memory (EEPROM). Thus switching the EPROM allows the entire device to be reprogrammed with different kinds of programs. Using the microprocessor in combination with the EEPROM the actual loaded program may be modified by simply changing program algorithms setting user activated parameters. Therewith an optimal adaptation to user demand is achieved. Furthermore at least one physical measurement is fed to the microprocessor in digital form. Thus a complex valvespecific program can be held in the EPROM and the data for a particular use of valve in the EEPROM. The use of a microprocessor makes it possible to have internal parallel or serial interfaces for operation by a particular kind of bus system that are limited to DDC (direct digital control) systems. Furthermore microprocessor-controlled internal thresholds are available for switching externally connected electrical devices.

In accordance with this invention parameters of the program brought up as default values by factory setting can be changed via the input panel and the program includes security routines one of which is capable of displaying errors on the display and all are capable of having their sensitivity changed via the panel. Furthermore when the device is used for controlling the temperature of water fed in a circulation loop containing a circulating pump and several draw-off points adjustment of the water temperature is interrupted automatically as long as there is no water drawn off and the temperature of the water in the circulation loop is controlled by another device. The supply of hot water to the circulation loop is terminated in an emergency, for instance when the supply of cold water stops. Means can be provided to maintain the hot-water inlet of the valve closed in an emergency situation when the power fails. This means can be a battery, a solenoid valve, or the like. The line also is connected at uncouplable plugs to the computer and the motor and the display is mounted on the computer.

To change the various settings the panel is provided with pushbuttons. They include a set button actuatable to start the apparatus, a minus button to reduce the parameter shown on the display, and a plus button to increase the parameter shown on the display. The set button further is actuatable to store a number on the display. A real button can be actuated to set the apparatus in a real mode automatically operating the valve to set the temperature detected by the sensor to a set setpoint temperature and to display the temperature detected by the sensor and the plus and minus buttons have lamps that blink in the real mode to indicate operation of the valve to effect the corresponding temperature correction. A nominal button is actuatable to show on the display the set point temperature and enable the plus and minus buttons to be operated to change it.

Further pushbuttons can include a parameter button actuatable to set the apparatus in a parameter mode, showing at least one parameter on the display and enabling the plus or minus buttons to change the displayed parameter. The set button is actuatable in the parameter mode to store and enter the displayed parameter value. The real button can be actuated to reset to the real mode. A local button sets the apparatus in a local mode in which all of the other pushbuttons are effective and a remote button sets the apparatus in a remote mode inactivating all other pushbuttons and turns control of the apparatus over to a remote unit.

For safety sake the computer only enables the pushbuttons after a predetermined code has been entered and the computer limits the maximum temperature that the motor can set the valve for to a preset limit regardless of any value set after actuation of the nominal button. Furthermore access to the program and to the preset limit of temperature via the pushbuttons can be limited only to authorized persons and an internal microprocessor-controlled switch is actuatable to set an external device connected via a plug into safety mode.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
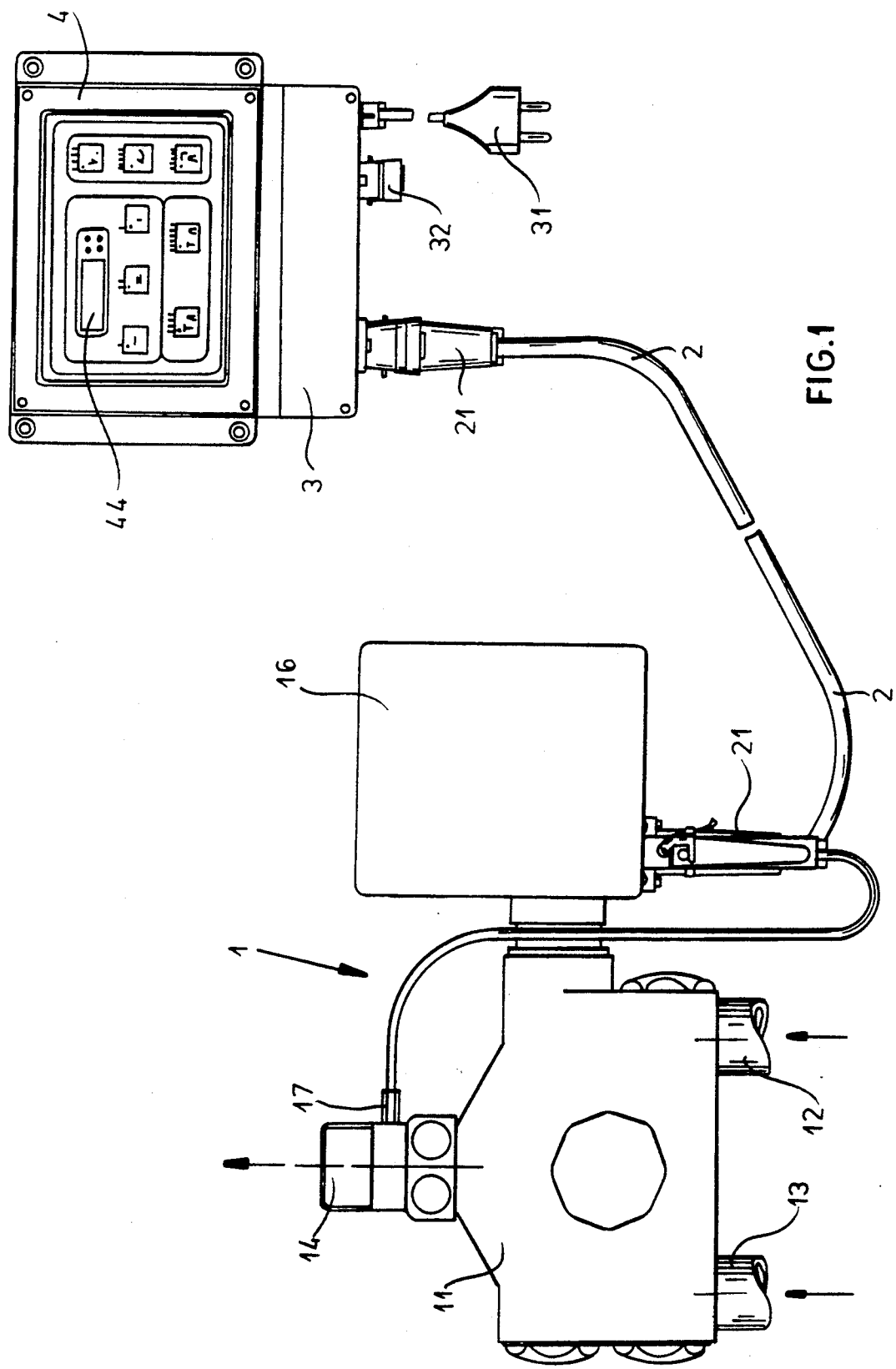
FIG. 1 is a general view of an example of the valve assembly of this invention.

As seen in FIG. 1 the system of this invention has a flow-control valve 1, a data line 2, a control and calculating computer or central processing unit (CPU) 3, a control panel 4 with an LCD display 44, and an actuating drive 16.

The valve 1 is formed by a valve housing 11 with a cold-water input connection 12, a hot-water input connection 13, and a mixed-water outlet 14 and has the adjustment actuating drive 16 and a temperature sensor 17. An unillustrated slide inside the housing 11 with an internal mechanical controller can be moved by the drive 16 to vary the temperature of water at the outlet 14, with an automatic adjusting device such as described in above-cited German 3,643,519. The actuating drive 16 has a threaded spindle that is connected to the temperature-sensitive adjusting element. The sensor 17 is mounted at the outlet 14.

The connection between the valve 1 and the CPU 3 is through the line 2 which is provided with plugs 21 at its ends that are connected to the CPU 3 and to the motor 16. The temperature sensor 17 is connected to the motor unit 16 and thence via the line 2 to the CPU 3.

Independently of the installation of the valve 1 the control panel 4 can be mounted in any convenient location. In the illustrated embodiment it is mounted right on the CPU 3. In addition a bus-interface plug socket 32 is provided for remotely operating the device, as well as a line connection 31 for feeding house current to the device.

The temperature of the output water of the valve 1 is set as follows:

The temperature of the output water is measured by the sensor 17 and is fed via the line 2 to the CPU 3 as an actualvalue. This value is compared in the CPU with a desired setpoint temperature that is inputted at the control panel 4 in accordance with factors dependent on the program that in turn is determined by the particularities of the valve. The result is the production of a control signal for the actuating drive 16 that resets the valve 1 to move the output temperature toward the set-point temperature.

The CPU 3 is formed as a single-chip microprocessor with an external random access memory and external erasable/programmable read-only memory (EPROM). One or more physical measurements such as temperature, flow volume, pH, and the like can be determined by appropriate sensors and fed in digital form to the CPU 3 where they are compared with respective set points and respective control signals are generated, all according to the specific program in memory. The control signals are used to operate the motor 16.

Figure 2:
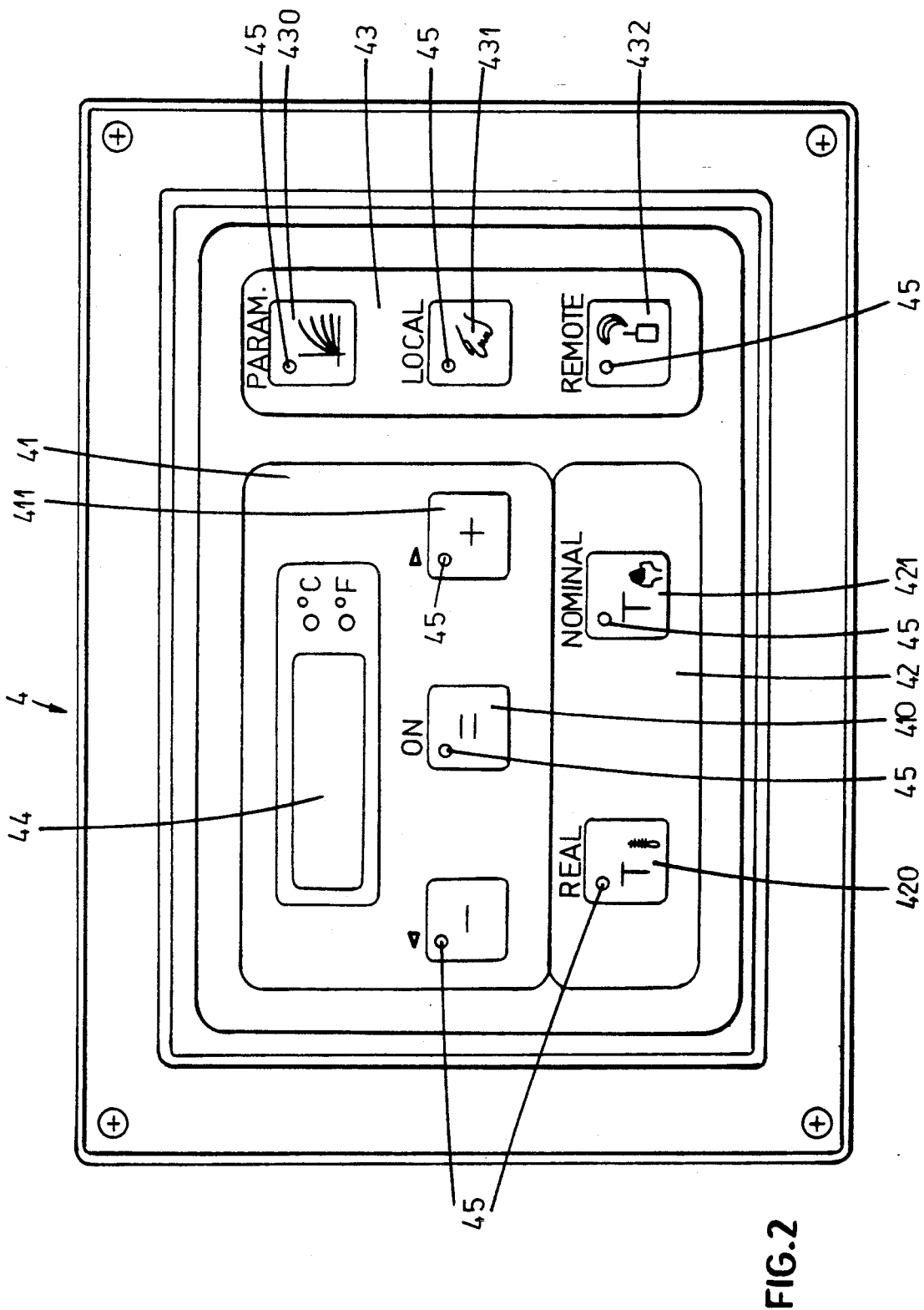
FIG. 2 is a larger-scale view of the control panel for the valve.

In order to set the device as shown in FIG. 1 the control panel 4 of FIG. 2 is used. This panel 4 has three pushbutton sets 41, 42, and 43. The first set 41 has in its upper region the LCD or LED display 44 for showing the desired and actual temperatures, parameter values, error numbers, remote instructions and the like. Below this display 44 is on the right side a plus button 411 and on the left side a minus button 412. Between the buttons 411 and 412 is a starting and storing button 410. The second set 41 has on the left side a real function button 420 and on the right side a nominal function button 421. Parallel and next to the two superposed blocks 41 and 42 the third block 43 has a parameter button 430, a local function button 431, and a remote function button 432. Each of these buttons has a light-emitting diode 45 acting as a pilot light that illuminates when the respective button is activated.

By means of these eight buttons 410, 411, 412, 420, 421, 4300, 431, and 432 and the display 44 all of the various setting procedures can be carried out in a simple and sure manner as described in particular below.

To start the control device the starting and storing button 410 is actuated. So long as the necessary feed voltage is present and the self-test functions of the microprocessor 3 are complete, the lamps 45 in the switches light up briefly. In addition the diode 45 lights up in the minus switch 412 when the valve 1 is being set to reduce the output temperature and in the switch 411 when the temperature is being increased. In addition an error number is shown alternately with the actual water temperature on the display 44 if something is wrong and the LEDs in minus switch 412 and plus switch 411 blink. When the system is operating correctly, actuation of the real button 420 sets the device in the "real" mode, with the display 44 showing the actual temperature and the lamps 45 of the switches 411 and 412 operating as described above. When something is wrong, a describing error number is shown and at the same time the safety routines are started.

On the other hand if the nominal button 421 is actuated, the device is set in the "nominal" mode and the current setpoint temperature is shown on the display 44 and it can be changed up or down by actuation of the plus key 411 or minus key 412. During such setting, an upper limit temperature that is otherwise selected, cannot be exceeded even though a higher setpoint temperature can be displayed. Once the new temperature is set, actuation of the set button 410 stores it and returns the device to automatic operation.

The nominal button 421 as well as the buttons of the set 43 can be set up to only work when a code is entered to prevent unauthorized use.

Actuation of the parameter button 430 sets the unit in the "parameter" mode so that the parameter numbers can be shown on the display 44, and actuation of the plus key 411 or minus key 412 can change these numbers. Once a parameter number has been appropriately changed, pushing of the set/memorize button 410 stores it and the next parameter number can be worked on.

Actuation of the real button 420 terminates this input and resets the device to the real mode.

The local and remote buttons 431 and 432 switch the device between local and remote control. When the local button 431 is pushed all the above-mentioned buttons of the panel 4 are active. When the remote button 432 is pushed the device moves into remote-control mode, in which case the display 44 only shows the actual temperature or, when the nominal button 421 is pushed the set-point temperature. In the remote-control mode the controlling master device is connected via the coupling 32 to the CPU 3.

We claim:

1. In combination with
   a mixing valve having hot- and cold-water inlets and a mixed-water outlet; and
   an actuating drive for operating the valve to change the blend of hot and cold water at the outlet; an apparatus for controlling and setting the valve via the actuating drive, the apparatus comprising:
   a sensor at the outlet for producing an actual-value output corresponding to the temperature of the water at the outlet;
   a digital computer;
   a line connecting the computer to the sensor and to the actuating drive;
   means including a display for indicating settings of the computer;
   a removable program module engageable in the computer for supplying a valve- and user-specific program thereto; and
   an input panel connected to the computer for programming same and provided with pushbuttons including
   a set button actuatable to start the apparatus,
   a minus button to reduce the parameter shown on the display,
   a plus button to increase the parameter shown on the display, the set button further being actuatable to store a number on the display,
   a real button actuatable to set the apparatus in a real mode automatically operating the valve to set the temperature detected by the sensor to a set set-point temperature and to display the temperature detected by the sensor, the plus and minus buttons having lamps that light in the real mode to indicate operation of the valve to effect the corresponding temperature correction, and
   a nominal button actuatable to show on the display the set point temperature and enable the plus and minus buttons to operated to change it.

2. The apparatus defined in claim 1 wherein the computer is a single-chip microprocessor with an external data memory and an external program memory, at least one physical measurement being fed to the microprocessor in digital form.

3. The apparatus defined in claim 2 wherein the microprocessor has an erasable program memory.

4. The apparatus defined in claim 2 wherein parameters of the program can be changed via the input panel.

5. The apparatus defined in claim 1 wherein means is provided to maintain the hot-water inlet of the valve closed in an emergency situation when e.g. the power fails.

6. The apparatus defined in claim 1 wherein the line is connected at uncouplable plugs to the computer and the motor and the display is mounted on the computer.

7. The apparatus defined in claim 1 wherein the pushbuttons further include:
   a parameter button actuable to set the apparatus in a parameter mode, show at least one parameter on the display, and enable the set, plus or minus buttons to select and change the displayed parameter, the real button being actuatable in the parameter mode to terminate the parameter operation.

8. The apparatus defined in claim 1 wherein the pushbuttons further include:
   a local button to set the apparatus in a local mode in which all of the other pushbuttons are effective; and
   a remote button to set the apparatus in a remote mode and turn control of the apparatus over to a remote unit.

9. The apparatus defined in claim 1 wherein the computer only enables the pushbuttons after a predetermined code has been entered.

10. The apparatus defined in claim 1 wherein the computer limits the maximum temperature that the drive can set by the valve to a preset user-defined limit regardless of any value set after actuation of the nominal button.

11. The apparatus defined in claim 1 wherein access to the program via the pushbuttons can be limited only to authorized persons.

12. The apparatus defined in claim 1, further comprising
    an internal microprocessor-controlled switch actuating via a plug to set an external connected device into a safety mode.

13. The apparatus defined in claim 1 wherein the lamps blink in case of error.

14. In combination with
    a mixing valve having hot- and cold-water inlets and a mixed-water outlet; and
    an actuating drive for operating the valve to change the blend of hot and cold water at the outlet; an apparatus for controlling and setting the valve via the actuating drive, the apparatus comprising:
    a sensor at the outlet for producing an actual-value output corresponding to the temperature of the water at the outlet;
    a digital computer;
    a line connecting the computer to the sensor and to the actuating drive;
    means including a display for indicating settings of the computer;
    a removable program module engageable in the computer for supplying a valve- and user-specific program thereto; and
    an input panel connected to the computer for programming same, the program including several different and independent security routines capable of displaying errors on the display and capable of being changed with respect to sensitivity via the panel.

15. In combination with
    a mixing valve having hot- and cold-water inlets and a mixed-water outlet; and
    an actuating drive for operating the valve to change the blend of hot and cold water at the outlet; an apparatus for controlling and setting the valve via the actuating drive, the apparatus comprising:
    a sensor at the outlet for producing an actual-value output corresponding to the temperature of the water at the outlet;

a digital computer;

a line connecting the computer to the sensor and to the actuating drive;

means including a display for indicating settings of the computer;

a removable program module engageable in the computer for supplying a valve- and user-specific program thereto; and an input panel connected to the computer for programming same, when used for controlling the temperature of water fed in a circulation loop containing a circulation pump and several draw-off points adjustment of the water temperature by the apparatus being interrupted automatically as long as there is no draw-off of water and the temperature of the water in the circulation loop is controlled by another device.

16. The apparatus defined in claim 15 wherein circulation is stopped in an emergency.

17. The apparatus defined in claim 16 wherein the apparatus is battery powered.

* * * * *